No. 752,362. Patented February 16, 1904.

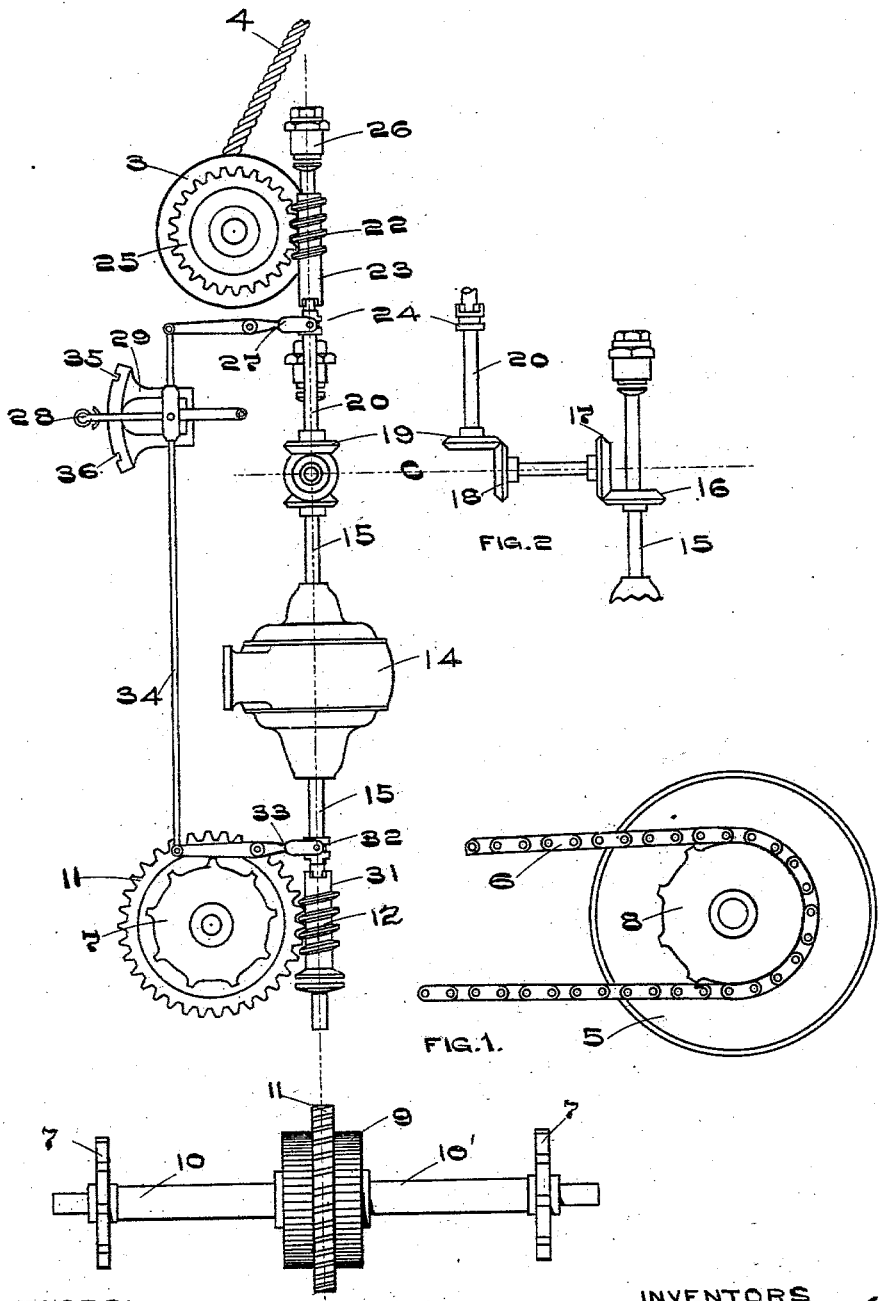

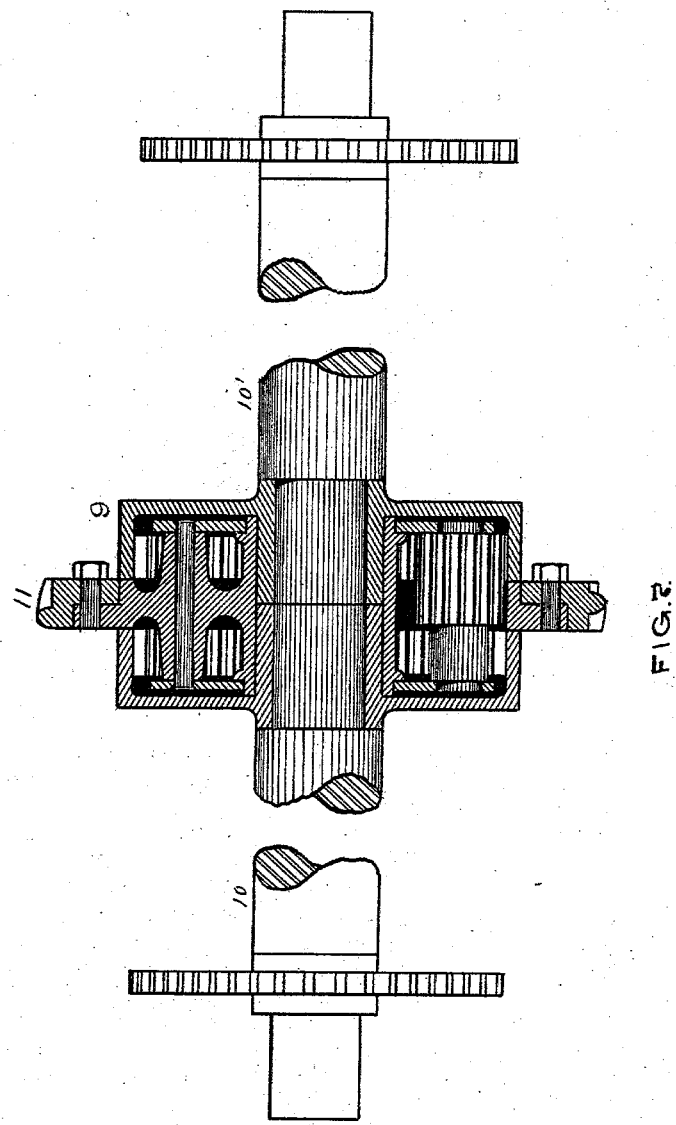

UNITED STATES PATENT OFFICE.

FREDERIC E. SMITH AND EDWARD R. INMAN, OF FRANKLIN, PENNSYLVANIA; SAID INMAN ASSIGNOR TO SAID SMITH.

PORTABLE TRACTION-CRANE.

SPECIFICATION forming part of Letters Patent No. 752,362, dated February 16, 1904.

Application filed November 6, 1902. Serial No. 130,266. (No model.)

*To all whom it may concern:*

Be it known that we, FREDERIC E. SMITH and EDWARD R. INMAN, of the city of Franklin, in the county of Venango and State of Pennsylvania, have invented new and useful Improvements in Portable Traction-Cranes; and we do hereby declare the following to be a full, clear, and exact description of said invention, reference being had to the accompanying drawings, and to the figures of reference marked thereon, which form a part of this specification.

Our invention relates to an improved portable traction crane and hoist to be used in and about machine-shops, warehouses, docks, and other places where the hoisting, conveying, and moving of machinery, freight, and heavy articles of merchandise are a common and necessary operation.

Our device differs from other existing devices for the purpose specified of which we have knowledge in that the traction and hoisting mechanism are both actuated by one motor, whereas other industrial cranes are equipped with separate motors for each of these respective purposes; furthermore, in that our device is adapted to travel upon a floor or level surface and requires no track. Hence it is obvious that the scope of its operation is much wider and its availability greater than if it were confined to a track, as are other power-actuated cranes.

The construction and operation of our device will be understood from the following description, reference being had to the accompanying drawings, which constitute a part of this specification.

Figure 4:
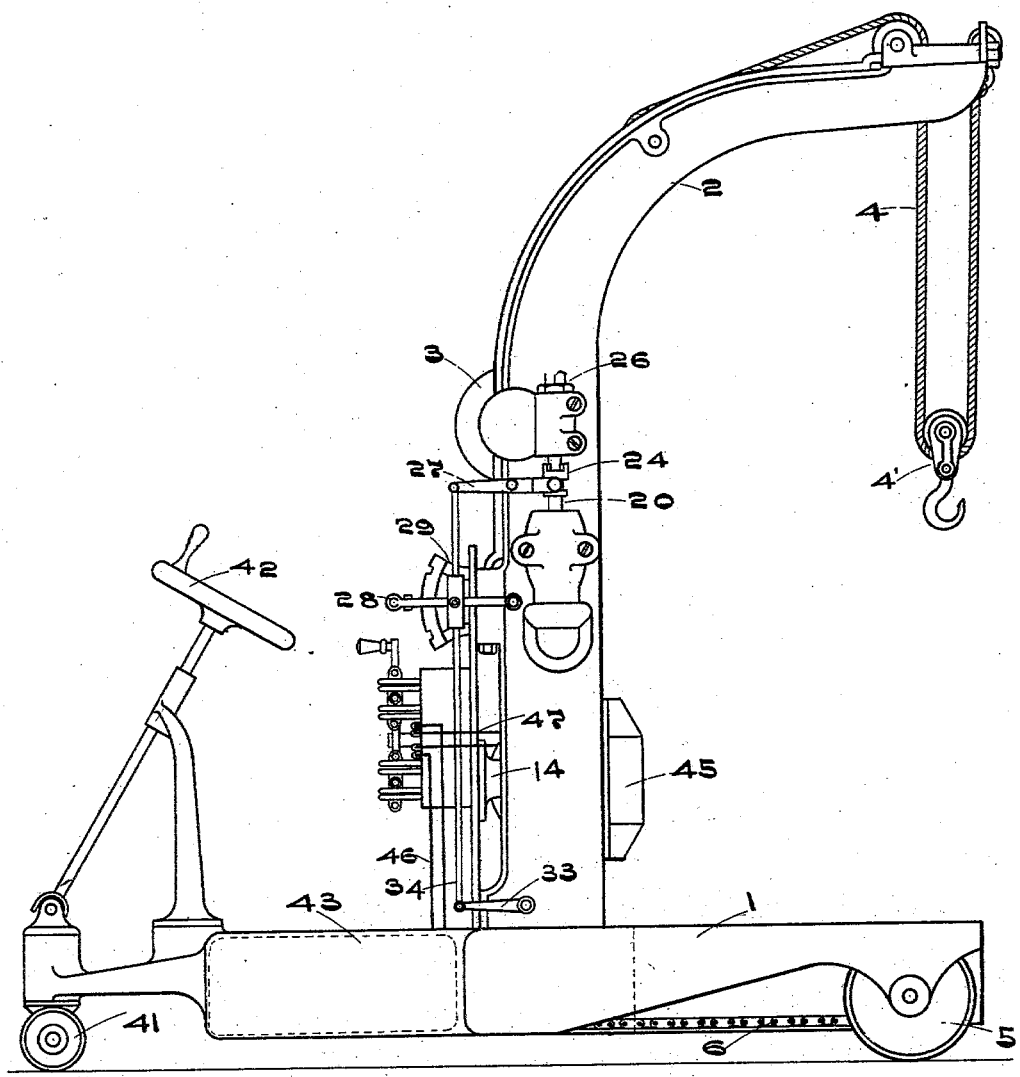
Figure 5:
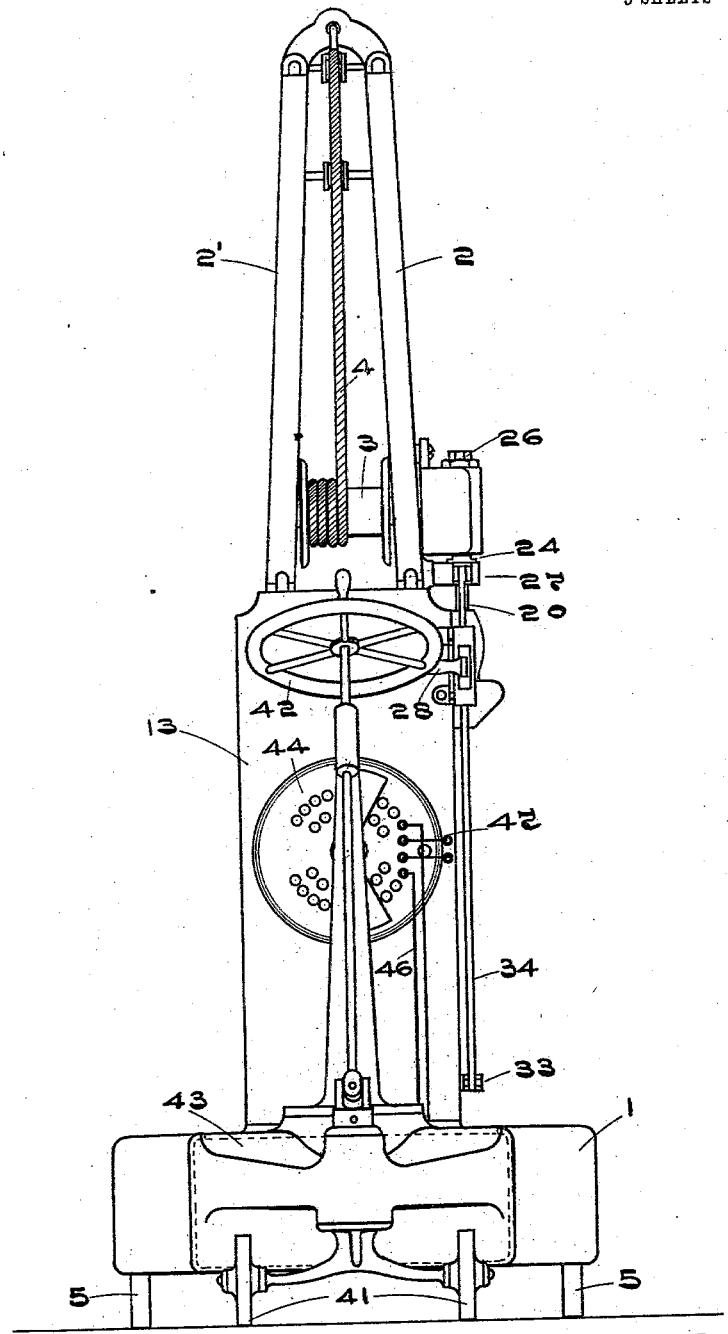
Figure 6:
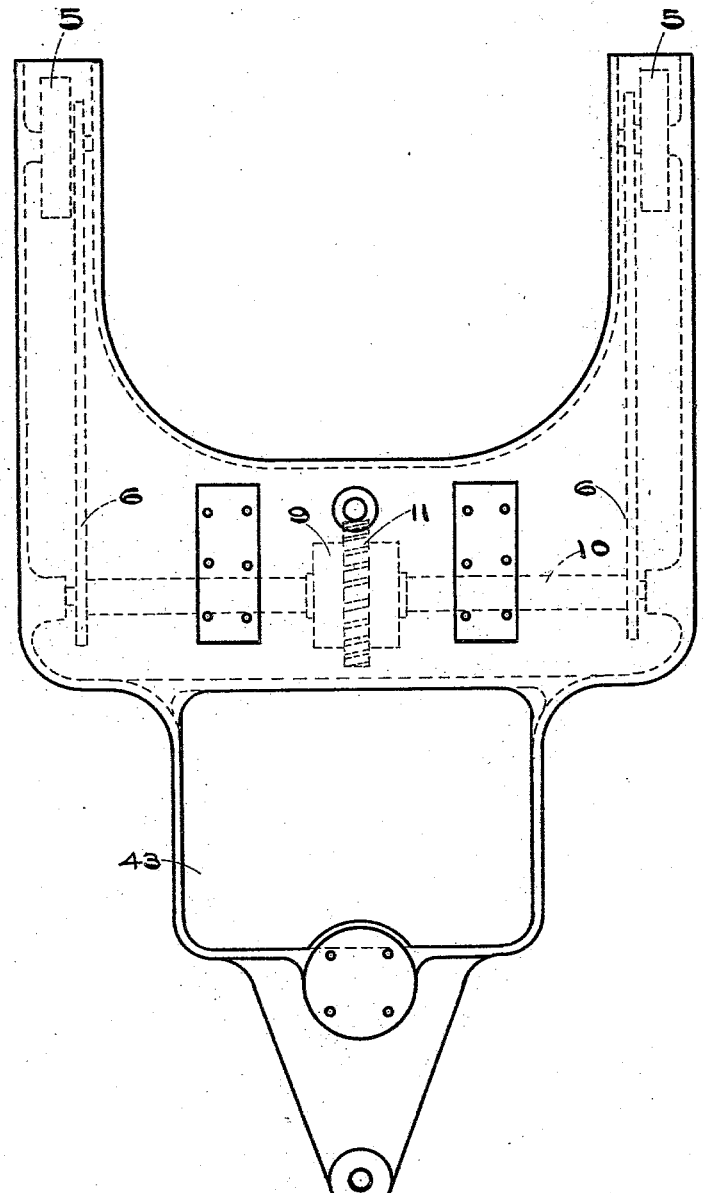

In the drawings, Figure 1 is a side elevation of the driving and hoisting mechanism stripped of its housing or inclosing framework. Fig. 2 is a side elevation of a portion of the gearing shown in Fig. 1. Fig. 3 is an elevation of the driving or traction shaft of our device. Fig. 4 is a side elevation of our complete device. Fig. 5 is an end elevation. Fig. 6 is a plan view of the bed. Fig. 7 is a section of the differential or compensating gear shown in Fig. 3, the same being enlarged for clearer illustration.

The same figures of reference indicate identical parts throughout the several views.

The actuating power which we employ both for hoisting and traction is an electric motor, and the current for operating same is drawn from a storage battery located in the bed of our device. Thus, be it understood, the device here shown is self-contained and does not require when in operation to be connected by mains to an electric generator. Upon the bed 1 are mounted two upright standards 2 and 2', which project horizontally forward at the top, forming a jib for the reception of the hoisting-tackle. About midway upon the upright portion of said standards is mounted a drum 3, upon which the hoisting cable or chain 4 is wound.

The traction-gearing consists of the traction-wheels 5, driving-chain 6, sprockets 7 and 8, the differential or compensating gear 9, and the shafts 10 and 10', to which the members of said gear 9 are attached. The compensating gear 9 has upon the periphery of its inclosing case a worm-gear 11, adapted to engage with and be driven by the worm 12 upon the motor-shaft. The object of providing and locating the compensating gear as here shown is to permit the traction-wheels to revolve at a different rate of speed when the crane is turning around or in a circle, and by a reference to Fig. 7 it will be obvious how such differentiation is provided for.

Upon the rear face of the standards 2 and 2' is mounted a sole-plate 13, to which the motor 14 is attached, said motor being located midway between the standards, with its shaft vertical.

At or near the upper end of motor-shaft 15 is rigidly affixed a miter-gear 16, engaging with gear 17, which is mounted on a horizontal shaft projecting through the standard 2 and bearing another miter-gear 18, which in turn engages with gear 19, attached to the vertical shaft 29, a suitable bearing for which shaft 20 is provided upon the outer face of standard 2. Upon shaft 20 is revolubly mounted a worm 22, the lower end whereof terminates in a clutch member or toothed sleeve 23, and below said sleeve is slidingly mounted or feathered to the shaft 20 the other member 24 of said clutch. Worm 22 engages with and operates worm-gear 25, which is rigidly attached to the drum-shaft.

A thrust-bearing 26 is provided at the upper end of shaft 20.

A lever 27 is provided for the purpose of engaging and disengaging the clutch members 23 and 24.

The motor-shaft extends below the motor for a similar operation of the traction-gear, and the lower end of shaft 15 has revolubly mounted thereon a worm 12, which engages with the worm-gear 11 upon the periphery of the inclosing case of the differential gear. The upper portion of worm 12 terminates in a toothed sleeve or clutch member 31, and above said member 31 is juxtaposed the companion member 32 of the clutch, said member 32 being feathered to the shaft and adapted to be engaged with and disengaged from member 31 by means of the lever 33. When the clutch members 31 and 32 are in engagement, the shafts 10 and 10' are caused to revolve through the medium of the worm-gearing, and motion is transmitted to the traction-wheels 5 by the chain 6, which passes about the sprocket-wheels 7 and 8. In Fig. 1 the chain 6 is broken away to expose other parts to view.

Lever 33 and lever 27 are connected to the hand-lever 28 and are actuated thereby by means of the rod 34.

From the construction and arrangement above set forth be it understood that when the lever 28 is in the position shown both the hoisting and the traction gearing are disengaged from the operation of the motor and that when said lever 28 is thrown upward and secured in notch 35 of the sector 29 the traction-gearing is engaged and caused to operate; that when the lever 28 is thrown downward and secured at notch 36 of said sector the hoisting-gear is engaged and caused to operate.

Our device is adapted, with a controller 44 of any standard type, for cranework; but the one here shown is the U-type controller manufactured by the Electric Controller and Supply Co., of Cleveland, Ohio, and through this device provision is made to operate the motor in either direction, which is quite desirable and necessary in a device of the class here described. We are aware of a certain patent to Cole and Swart, dated April 30, 1901, and numbered 673,317; but we do not herein show or attempt to claim an automatic controller of the type covered by said patent; but we do seek to claim in a device of the class here shown a controller to be independently operated in combination with other elements, such as are here shown and described.

Upon the end of bed 1 is mounted the steering-wheels 41, which are operated by the hand-wheel 42.

Bed 1 is formed into a crate 43 and adapted for the reception of a storage battery and wherein is located a storage battery of a standard type.

By a reference to Fig. 6 it will be seen that said bed 1 in general outline is Y-shaped, the bifurcate forward ends being adapted to the reception of the traction-wheels and driving-chain and the contracted rear end being formed into the crate above described and also for the reception of the steering-gear. The crate 43 is provided with a suitable cover, which forms a platform upon which the operator may stand.

An inspection of Figs. 4 and 5 will show that all gearing is covered by shields or cases and is therefore hidden from view. A shield 45 also protects the motor from the liability of damage from the load suspended upon the hoisting-tackle. 46 and 47 are the wires leading from the storage battery, through the controller, to the motor. Though a storage battery is here shown, it can be readily understood that the current could be taken directly from a generator through suitable wires without departing from the scope of our invention.

Having thus described our device, what we claim as new, and desire to secure by Letters Patent, is—

1. In an improved portable traction-crane, a bed with bifurcate forward end adapted to the reception of traction-wheels and driving-chains, two standards mounted upon and projecting upwardly from said bed and terminating in a horizontal jib, adapted to the reception of hoisting-tackle, a hoisting-drum mounted between said standards, a vertical sole-plate attached to the rear of said standards, an electric motor mounted upon said sole-plate with its shaft in a vertical position, a train of gearing connecting the upper end of said motor-shaft and said drum, and adapted to transmit motion from said motor to said drum, a worm mounted upon the lower end of said motor-shaft, a traction-shaft mounted in the bed of said crane, a worm-geared compensating gear mounted upon said traction-shaft adapted to be driven by said last-mentioned worm, sprockets mounted upon said driving-shaft, traction-wheels mounted in the bifurcate ends of said bed, sprockets attached to said driving-wheels, a chain adapted to transmit motion thereto from the sprockets on the driving-shaft, means of throwing the traction-gearing in and out of engagement with the motor, means of throwing the hoisting-gearing in and out of engagement with the motor, a crate in said bed adapted to the reception of a storage battery, a storage battery located therein, suitable connections between said battery and said motor, a steering-gear, all combined and operating as shown and described.

2. In an improved portable traction-crane, a bed with a bifurcate forward end, traction-wheels located in the forward end of said bifurcations, jib-standards mounted upon the main body of said bed, hoisting-gearing mounted upon said standards, traction-gearing mounted in said bed, in combination with one motor, adapted to drive said traction-gear and said hoisting-gear.

3. In an improved portable traction-crane, a base having traction-gearing mounted therein, jib-standards mounted upon said base, hoisting mechanism mounted upon said jib-standards, a sole-plate attached to said standards, a motor attached to said sole-plate, with its shaft in a vertical position, and adapted to operate said hoisting and traction gearing.

4. In an improved traction-crane, a Y-shaped bed, traction-wheels mounted in the forward end of said bifurcations, a traction-shaft mounted in the main body of the bed, a differential gear mounted upon the center of said shaft, driving sprocket-wheels mounted at or near each end of said traction-shaft, driving-chains adapted to transmit motion from said driving sprocket-wheels, to the traction-wheels, said differential gear having a worm-gear upon its periphery, adapted to mesh with and be operated by a worm upon a motor-shaft, one motor suitably mounted upon said crane, adapted to operate the gearing aforesaid.

5. In an improved portable traction-crane, a bed, jib-standards mounted thereon, one electric motor mounted between the jib-standards, traction-gearing, a hoisting-drum, gearing adapted to transmit motion from the motor-shaft to traction-gearing and to said hoisting-drum, means for disengaging said gearing from the operation of the motor, substantially as and for the purpose specified.

6. In an improved portable traction-crane, a base or bed having traction-gearing mounted therein, jib-standards mounted upon said bed, hoisting-gearing mounted upon said standards, a motor suitably mounted upon said crane and adapted to actuate said hoisting and traction mechanism, a crate in said bed, adapted to the reception of a storage battery, a storage battery in said crate, a controller interposed between said battery and said motor, all substantially as and for the purpose specified.

In testimony whereof we affix our signatures in presence of two witnesses.

FREDERIC E. SMITH.
EDWARD R. INMAN.

Witnesses:
 ED. D. SMITH,
 JOHN P. FRAZIER.